(12) United States Patent
Sugawa et al.

(10) Patent No.: US 9,030,582 B2
(45) Date of Patent: May 12, 2015

(54) SOLID STATE IMAGE SENSOR AND METHOD FOR DRIVING THE SAME

(75) Inventors: Shigetoshi Sugawa, Sendai (JP); Hideki Tominaga, Kyoto (JP); Kenji Takubo, Kyoto (JP); Yasushi Kondo, Kyoto (JP)

(73) Assignees: Shimadzu Corporation, Kyoto-Shi (JP); Tohoku University, Miyagi (JP)

( * ) Notice: Subject to any disclaimer, the term of this patent is extended or adjusted under 35 U.S.C. 154(b) by 0 days.

(21) Appl. No.: 13/983,975

(22) PCT Filed: Feb. 8, 2011

(86) PCT No.: PCT/JP2011/052602
§ 371 (c)(1),
(2), (4) Date: Aug. 6, 2013

(87) PCT Pub. No.: WO2012/107995
PCT Pub. Date: Aug. 16, 2012

(65) Prior Publication Data
US 2013/0308023 A1 Nov. 21, 2013

(51) Int. Cl.
H04N 3/14 (2006.01)
H04N 5/335 (2011.01)
H04N 5/357 (2011.01)
H04N 5/3745 (2011.01)
H04N 5/378 (2011.01)

(52) U.S. Cl.
CPC ............. *H04N 5/357* (2013.01); *H04N 5/3575* (2013.01); *H04N 5/37452* (2013.01); *H04N 5/378* (2013.01); *H04N 5/3745* (2013.01)

(58) Field of Classification Search
USPC ......... 348/294–324; 250/208.1; 257/290–292
See application file for complete search history.

(56) References Cited

U.S. PATENT DOCUMENTS 8,482,640 B2 * 7/2013 Sugaw et al. ................. 348/294
2010/0188538 A1 7/2010 Sugawa et al.

FOREIGN PATENT DOCUMENTS

| CN | 101796821 | | 8/2010 |
| EP | 2192765 | A1 | 6/2010 |
| EP | 2288142 | | 2/2011 |
| JP | 2001-245209 | A | 9/2001 |
| JP | 2001345441 | | 12/2001 |
| JP | 2002-57947 | A | 2/2002 |

(Continued)

OTHER PUBLICATIONS

PCT International Patent Application No. PCT/JP2011/052602, International Written Opinion mailed on Mar. 15, 2011, 9 pages (5 pages of English Translation and 4 pages of Official Copy).

(Continued)

*Primary Examiner* — Yogesh Aggarwal
(74) *Attorney, Agent, or Firm* — Morgan, Lewis & Bockius LLP

(57) ABSTRACT

A transistor (24) which acts as a load-current source for a source follower amplifying transistor (22) for outputting a pixel signal to a pixel output line (40) is provided in each picture element (10), whereby a high bias current is prevented from passing through the high-resistance pixel output line (40), so that a variation in an offset voltage among picture elements is suppressed. Inclusion of the high-resistance pixel output line (40) into the source follower amplification circuit is also avoided, whereby the gain characteristics are prevented from deterioration. Thus, the S/N ratio of the picture element is improved so as to enhance the quality of the images.

8 Claims, 11 Drawing Sheets

(56) References Cited

FOREIGN PATENT DOCUMENTS

| | | |
|---|---|---|
| JP | WO2009031302 | 3/2009 |
| KR | 20100039884 | 4/2010 |
| WO | WO-2009031301 | 3/2009 |
| WO | WO-2009150828 | 12/2009 |

OTHER PUBLICATIONS

PCT International Patent Application No. PCT/JP2011/052602, International Preliminary Report on Patentability mailed Aug. 22, 2013, 12 pages (7 pages of English Translation and 5 pages of Official Copy).

Kondo et al., "Kousokudo Bideo Kamera HyperVision HPV-1 no Kaihatsu (Development of "HyperVision HPV-1" High-Speed Video Camera)", Shimadzu Hyouron (Shimadzu Review), Shimadzu Hyouron Henshuu-bu, Sep. 30, 2005, vol. 62, No. 1/2, pp. 79-86.

International Search Report mailed Mar. 15, 2011 for International Application No. PCT/JP2011/052602 (2 pages).

* cited by examiner

Fig. 5
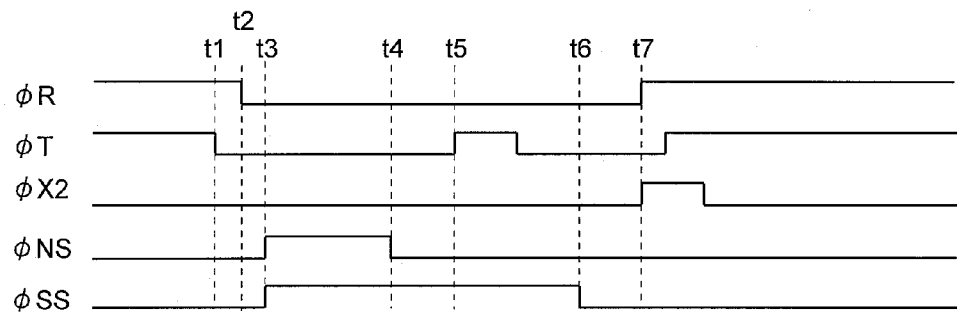
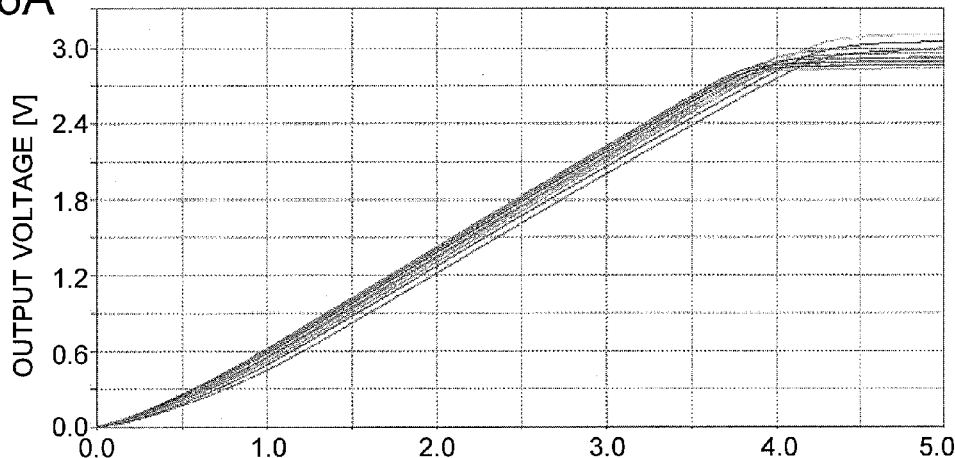
Fig. 6A
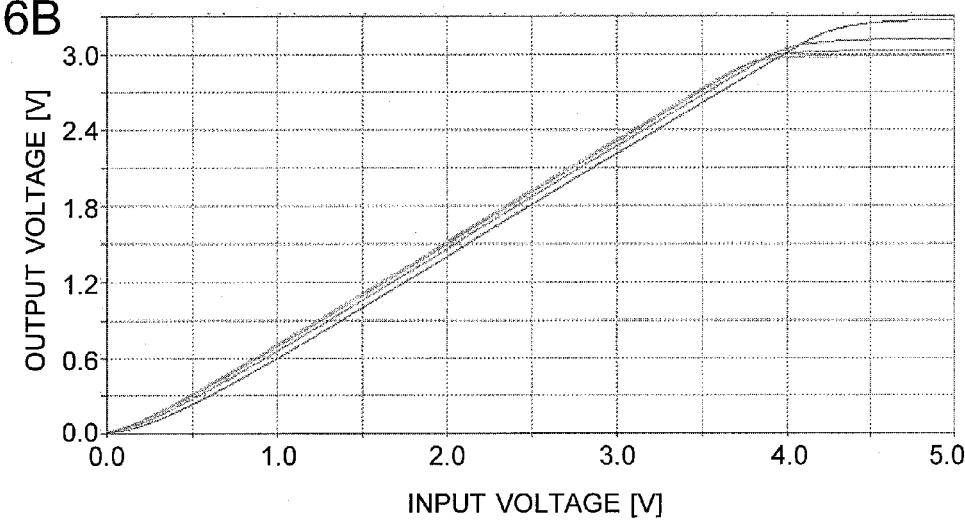
Fig. 6B

INPUT VOLTAGE [V]

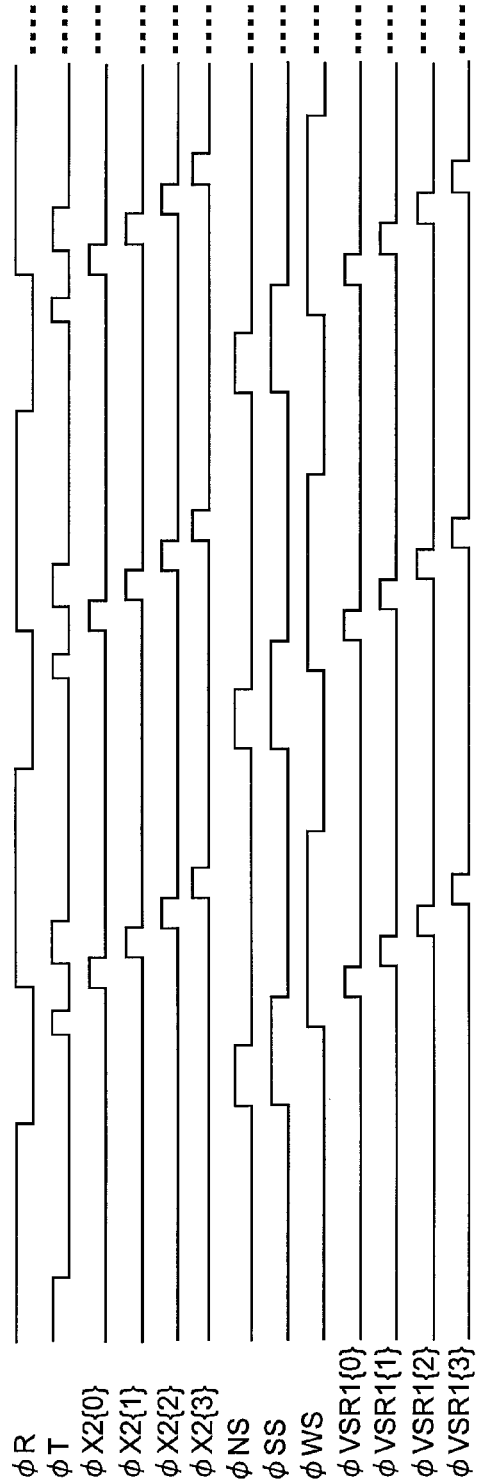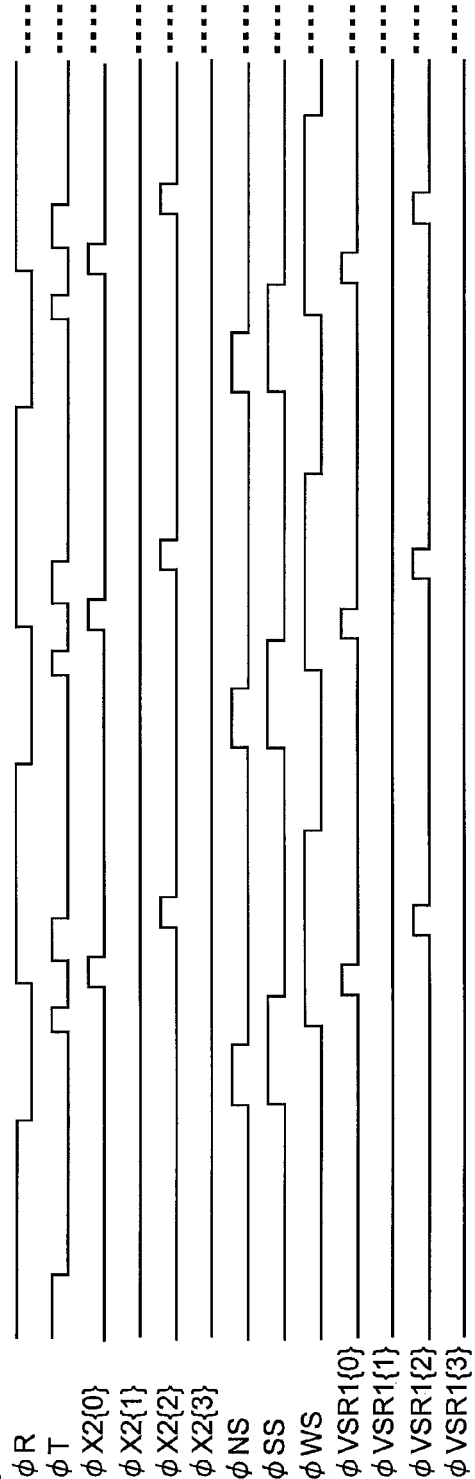

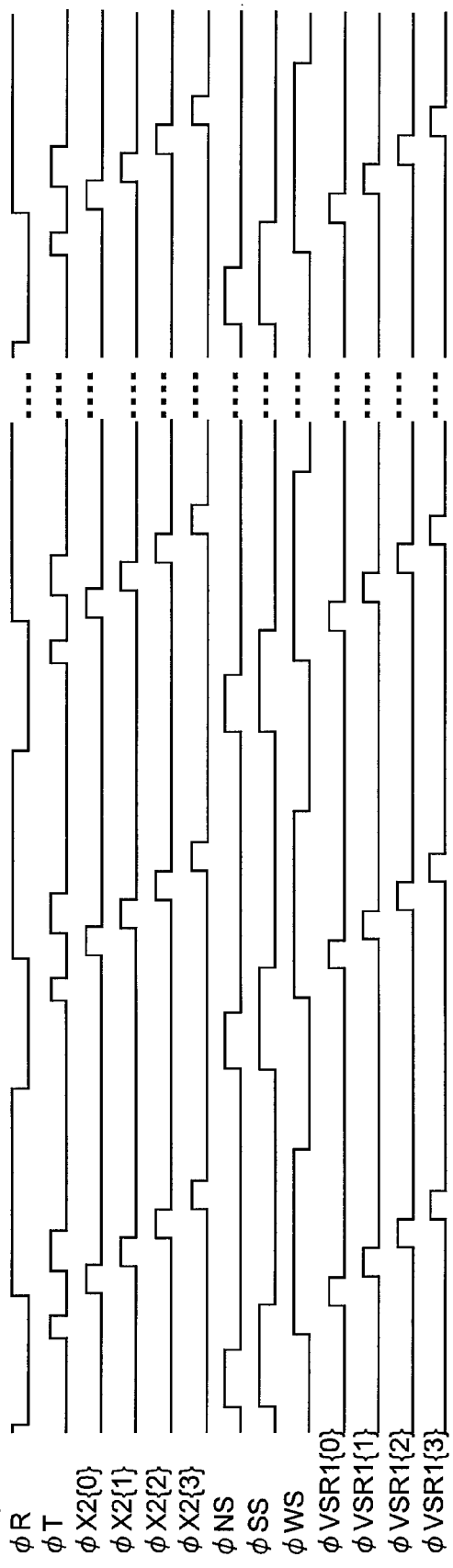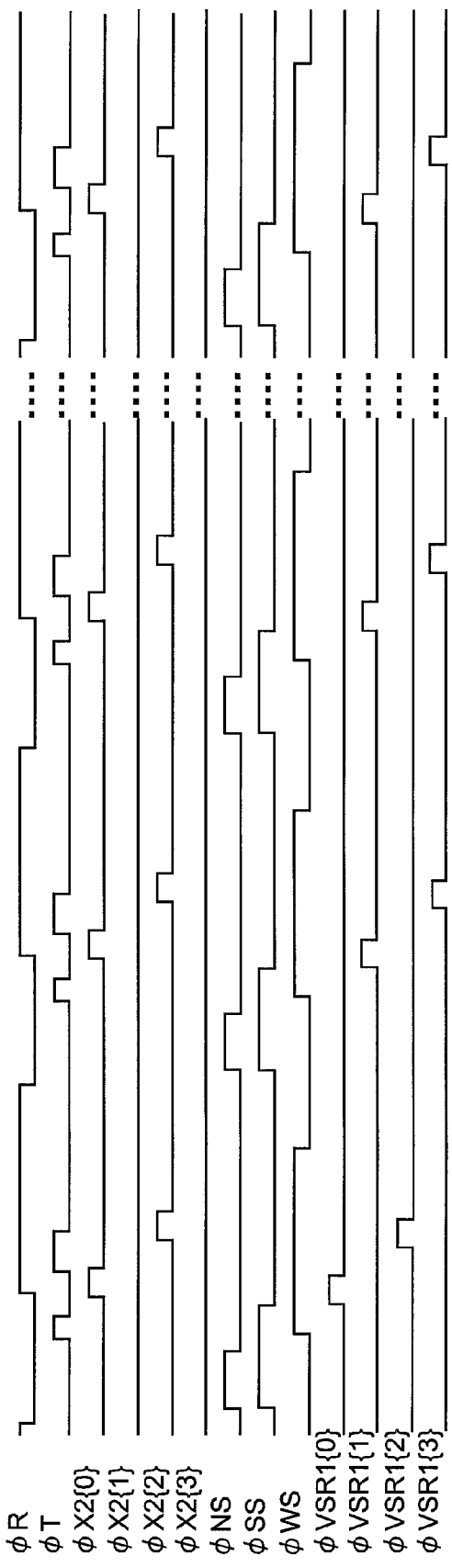

SOLID STATE IMAGE SENSOR AND METHOD FOR DRIVING THE SAME

TECHNICAL FIELD

The present invention relates to a solid-state image sensor and a method for driving such a sensor. More specifically, it relates to a solid-state image sensor capable of high-speed operations suitable for taking images of ultrahigh-speed phenomena, such as destructions, explosions or combustions, as well as a method for driving such a sensor.

BACKGROUND ART

High-speed imaging devices (high-speed video cameras) used for taking consecutive images of high-speed phenomena, such as explosions, destructions, combustions, collisions or electric discharges, for only a short period of time, have been conventionally known (for example, see Non-Patent Document 1). Such high-speed imaging devices need to perform an ultrahigh-speed imaging operation at a level of one million frames per second or even higher. Accordingly, they use solid-state image sensors capable of high-speed operations, which have special structures different from conventional image sensors used in commonly used video cameras, digital cameras and similar devices.

Conventionally known solid-state image sensors suitable for the aforementioned applications include a charge-coupled device (CCD) type solid-state image sensor called the "in-situ storage image sensor" (which is disclosed in Patent Document 1 and other documents) and a metal-oxide semiconductor (MOS) type solid-state image sensor (which is disclosed in Patent Documents 2, 3 and other documents). The latter type, which has been proposed by some of the present inventors in order to solve various problems related to the former type, is a MOS-type solid-state image sensor having two spatially separated areas (pixel area and memory area), where the pixel area includes a two-dimensional array of picture elements (pixels) each of which includes a photodiode and the memory area includes a two-dimensional array of memory-array units each of which corresponds to one picture element and has a large number of memory cells (capacitors) for storing image signals.

In the solid-state image sensor disclosed in Patent Document 2, the total number of picture elements is the same as that of the memory-array units, and each picture element is connected to one memory-array unit by a separate column line. This structure allows all the signals in the picture elements to be simultaneously transferred from the picture elements to the memory-array units through the respective column lines. However, since this design requires the same number of column lines as that of the picture elements and hence a considerably large area for the wiring of the column lines on the sensor chip, it is difficult to increase the aperture ratio of the light-receiving section (photodiode).

In the solid-state image sensor disclosed in Patent Document 3, N picture elements are connected to N memory-array units by one common column line (where N is an integer equal to or greater than two). This design reduces the total number of column lines to one N-th of the total number of picture elements and therefore requires a smaller area for the wiring of the column lines, which is advantageous for increasing the aperture ratio of the light-receiving section. However, the transfer of pixel signals from the picture elements to the memory-array units through the column lines cannot be simultaneously performed on all the picture elements; the pixel signals held in N picture elements sharing one column line must be transferred to the memory-array units by a time-sharing control.

Unlike the commonly used solid-state image sensors having only one column line per one column of picture elements, the previously described high-speed MOS-type solid-state image sensor has a greater number of column lines, which is equal to the number of picture elements per one column or one N-th of the number of picture elements per one column. This is because commonly used solid-state image sensors operate at comparatively low frame rates and are allowed to use a sufficiently long period of time to read signals from the picture elements, whereas high-speed solid-state image sensors must completely read signals within an incomparably short period of time (within a range from a few nanoseconds to several tens of nanoseconds for a high-speed imaging of one million frames per second or higher), which requires a reading and storing operation including the steps of simultaneously reading signals at all the picture elements and subsequently writing the signals in the memory cells, or the steps of simultaneously reading signals at one N-th of all the picture elements and subsequently writing the signals in the memory cells.

Although various ideas for high-speed operations have been adopted, the previously described conventional MOS-type solid-state image sensor for high-speed imaging has the following problem.

In any of the solid-state image sensors for high-speed imaging described in Patent Documents 2 and 3, a source follower amplifier is provided inside each picture element so as to write a voltage signal from the picture element into a memory cell in the memory-array unit by driving a column line. The load-current sources for these source follower amplifiers are collectively arranged in a current-source area provided between the pixel area and the memory area. This design is primarily aimed at reducing the pixel size and effectively using the surface area of the sensor chip.

In the aforementioned solid-state image sensors for high-speed imaging, the column line, which constitutes a portion of the load to be driven, has a sub-micron width (e.g. 0.28 µm), while its length is considerably long, reaching up to several millimeters, due to the separation between the pixel area and the memory area. Accordingly, the column line has a considerably high parasitic resistance (e.g. approximately 1 kΩ for an aluminum line). Furthermore, the presence of a plurality of closely located column lines extending parallel to each other on the sensor chip causes a considerably high parasitic capacitance (e.g. 1 pF). To charge and discharge a load having such a high resistance and high capacitance within a short period of time (e.g. 20 ns), the bias current supplied to the source follower amplifier for driving the column line must be, for example, as high as 100 µA (this value is a mere example; the actual value depends on the size of the source follower amplifier).

In the case where the load-current source is separated from the picture element in the previously described manner, the bias current flows through the column line itself. As a result, a voltage drop occurs due to the aforementioned parasitic resistance, causing an offset voltage between the outlet end (connected to the load-current source) and the inlet end (connected to the picture element) of the column line. Since there is a significant difference in the distance to the current-source area between a picture element located near the center of the pixel area and a picture element located near the bottom end of the same area (i.e. in a region close to the current-source area), the pixel-signal voltages at these picture elements have different offset voltages. Furthermore, the presence of the high-resistance column line between the driving transistor of the source follower amplifier inside the picture element and the load-current source deteriorates the gain characteristics of the source follower amplifier. The extent of this deterioration in the gain characteristics also significantly varies depending on whether the picture element is located near the center of the pixel area or near the bottom end of the same area, causing the gain characteristics to vary among the picture elements.

A variation in the gain characteristics among the picture elements also results from the following reason: If the same number of load-current sources as that of the picture elements is provided on the small current-source area, the return paths of the bias current for the source follower amplifiers will be gathered in the small space of the current-source area. For example, the solid-state image sensors disclosed in Patent Documents 2 and 3 have the entire set of picture elements divided into two halves, with each half coupled with a different current-source area and a different memory area. If, for example, the total number of pixels is 400×256, a high electric current of 400×128×100 μA=5.12 A produced by one half of the picture elements will instantaneously rush into one current-source area.

An attempt to lower the resistance of the power wire on the low-voltage side by increasing the wire's width cannot completely decrease the resistance to zero. Thus, the voltage drop due to the wire always exists, causing a rise in the low-voltage side potential near the current-source area (which is normally at the ground potential). (For example, the rise is approximately 500 mV for a wiring resistance of 0.1Ω.) As a result, the gate bias voltage of the current-source transistor fluctuates, causing a change in the bias current which determines the operation point of the source follower amplifier inside each picture element, and thus constituting a destabilizing factor for the gain characteristics. For example, in a system having the low-voltage side power wires connected to the current-source area from both sides of the sensor chip, the aforementioned rise in the ground-side potential is greater in the central region of the chip than at both ends. This is also a major cause of the difference in the gain characteristics among the picture elements.

BACKGROUND ART DOCUMENT

Patent Document

Patent Document 1: JP-A 2001-345441
Patent Document 2: WO 2009/031301
Patent Document 3: WO 2009/150828

Non-Patent Document

Non-Patent Document 1: Non-Patent Document 1: Kondo et al., "Kousokudo Bideo Kamera HyperVision HPV-1 no Kaihatsu (Development of "HyperVision HPV-1" High-Speed Video Camera)", Shimadzu Hyouron (Shimadzu Review), Shimadzu Hyouron Henshuu-bu, Sep. 30, 2005, Vol. 62, No. 1/2, pp. 79-86

SUMMARY OF THE INVENTION

Problem to be Solved by the Invention

The previously described variations in the offset voltage and the gain characteristics among the picture elements are noise factors which deteriorate the quality of the pixel signals. Reducing the noise due to such factors to improve the signal-to-noise ratio of the pixel signals as much as possible is particularly essential for achieving an adequately high image quality in the solid-stage image sensor for high-speed imaging whose signal level at each picture element is considerably low due to the extremely short exposure time (charge accumulating time) available for the imaging.

The present invention has been developed in view of the aforementioned problems. Its objective is to provide a solid-state image sensor and a method for driving such a sensor, in which the noise superposed on the pixel signal is lowered by reducing the difference in the offset voltage and/or the gain characteristics among the picture elements, so that it is possible to improve the image quality or increase the imaging speed while maintaining the image quality at approximately the same level.

Means for Solving the Problems

A solid-state image sensor according to the first aspect of the present invention aimed at solving the aforementioned problem includes:

a) a pixel area with a plurality of picture elements arranged therein, each picture element including a photodiode, a detection node for converting a photocharge generated by the photodiode from an electric-charge signal into a voltage signal, a transfer gate for controlling the transfer of a photocharge from the photodiode to the detection node, and a buffer circuit for transmitting the voltage signal produced by the detection node to one of the pixel output lines to be described later;

b) a memory area, which is separated from the pixel area, and in which a plurality of memory units whose number is equal to the number of picture elements are arranged, with each memory unit corresponding to one picture element and having a plurality of memory cells provided therein; and c) pixel output lines whose number is equal to the number of picture elements as well as the number of memory units, with each pixel output line separately connecting one picture element in the pixel area and one memory unit in the memory area, wherein the buffer circuit includes at least one current driver for driving the pixel output line, and the current driver includes a current source which is located inside the picture element concerned and which becomes a load.

A solid-state image sensor according to the second aspect of the present invention aimed at solving the aforementioned problem includes:

a) a pixel area with a plurality of picture elements arranged therein, each picture element including a photodiode, a detection node for converting a photocharge generated by the photodiode from an electric-charge signal into a voltage signal, a transfer gate for controlling the transfer of a photocharge from the photodiode to the detection node, and a buffer circuit for transmitting the voltage signal produced by the detection node to a pixel output line to be described later;

b) a memory area, which is separated from the pixel area, and in which memory units are arranged, with each memory unit corresponding to one picture element and having a plurality of memory cells provided therein; and c) pixel output lines whose number is equal to the number of picture elements divided by N (where N is an integer equal to or greater than two), each pixel output line separately connecting one picture-element group consisting of N picture elements in the pixel area and one memory-unit group consisting of N memory units coupled with the aforementioned N picture elements, wherein the buffer circuit includes at least one current driver for driving the pixel output line and at least one pixel-selecting switch for selectively connecting one of the N picture elements to be connected to the same pixel output line, the current driver includes a current source which is located inside the picture element concerned and which becomes a load, and N pixel-selecting signal lines are separately and respectively connected to the pixel-selecting switches of the N picture elements to be connected to the same pixel output line.

In the solid-state image sensor according to the first or second aspect of the present invention, the current driver is typically a source follower amplifier.

As already explained, in the conventional solid-state image sensors of this type, the current sources which become loads for the current drivers are gathered in the current-source area. By contrast, in the solid-state image sensor according to the first or second aspect of the present invention, the current source which becomes a load for the current driver is provided inside each of the picture elements. This design prevents the bias current for the current driver (e.g. a source follower amplifier) from passing through the pixel output line. Accordingly, neither the voltage drop due to the resistance of the pixel output line itself nor the signal voltage offset due to the voltage drop occurs, and no variation in the offset voltage among the picture elements occurs due to the signal voltage offset. Furthermore, unlike the conventional configuration in which the pixel output line having a high resistance and capacitive is essentially included in the circuit of the current driver, the solid-state image sensor according to the first or second aspect of the present invention has the pixel output line separated from the circuit of the current driver. This design improves the gain characteristics in the current driver while eliminating gain errors among the picture elements.

Furthermore, in the solid-state image sensor according to the first or second aspect of the present invention, since the load-current sources of the picture elements are dispersed over the pixel area rather than gathered in a section of the sensor chip, the return paths of the currents which have passed through the load-current sources are dispersed. This design prevents an increase in the ground potential in a specific portion of the sensor chip and reduces the variation in the ground potential among the picture elements. As a result, the gain errors among the picture elements due to an increase in the ground potential are also suppressed.

In the solid-state image sensor according to the first aspect of the invention, since each picture element is provided with one separate pixel output line, the pixel signals held in all the picture elements can be simultaneously transferred through the pixel output lines to the memory units. On the other hand, in the solid-state image sensor according to the second aspect of the invention, since one pixel output line is shared by N picture elements, the picture element from which a signal is to be sent to one pixel output line is selected from one group of N picture elements by turning on and off the pixel-selecting switch included in each picture element. While a signal is being transmitted from one of the N picture elements of one group to the pixel output line, the current drivers of the other N−1 picture elements are not actually working.

In view of this problem, in the solid-state image sensor according to the second aspect of the present invention, the buffer circuit should preferably include a selector switch for turning on and off an operation of the current driver. Specifically, the selector switch may be a transistor for breaking a line connecting an amplifying transistor of the current driver and a transistor constituting the current source which becomes a load for the amplifying transistor.

In this system, while a signal is being transmitted from one of the N picture elements of one group to the pixel output line in the aforementioned manner, the current drivers of the other N−1 picture elements can be turned off by the selector switch. The deactivated current drivers consume less power since no load current passes through them. This has the effect of reducing the power consumption of the entire sensor.

In a preferable variation of the solid-state image sensor according to the first or second aspect of the present invention, a relay amplifier is provided in each of the pixel output lines, and a plurality of relay-amplifier areas formed along the extending direction of the pixel output lines are provided inside the memory area in order to arrange the relay amplifiers.

In this configuration, one pixel output line is driven not only by the current driver provided in the picture element; the task is shared by the current driver and the relay amplifier provided in the pixel output line. This design reduces the driving load per one amplifier, so that the driving operation can be performed at higher speeds. In the case of using a constant driving speed, the driving operation is performed with a lower bias current, so that the gain characteristics further improve. The decrease in the bias current supplied by the current driver inside the picture element suppresses the amount of electric current consumed in the pixel area, which causes a corresponding increase in the amount of electric current consumed in the relay-amplifier areas dispersed in the memory area. This means that the power consumption is dispersed over the entire sensor, whereby the power concentration which causes the aforementioned increase in the ground potential or other problems is further alleviated.

As already described, in the solid-state image sensor according to the second aspect of the present invention, each pixel output line is shared by N picture elements, and therefore, the time required for transferring one frame of image signals from the picture elements to the memory cells in the memory units is approximately N-times longer than in the case of the solid-state image sensor according to the first aspect of the present invention. This imposes an upper limit on the imaging speed of the solid-state image sensor according to the second aspect of the present invention.

To address this problem, a method for driving the solid-state image sensor according to the second aspect of the present invention is provided as the third aspect of the present invention, wherein the following two driving modes can be selected:

a first driving mode, in which the N pixel-selecting switches are sequentially selected by a control signal through the N pixel-selecting signal lines so as to sequentially connect the N picture elements to the common pixel output line; and a second driving mode, in which only a portion of the N pixel-selecting switches are sequentially selected by using only a portion of the N pixel-selecting signal lines so as to connect a portion of the N picture elements to the common pixel output line.

The first driving mode uses all the picture elements for the imaging, whereas, in the second driving mode, the imaging is performed using only a portion of the pixel group composed of N picture elements, rather than all the picture elements. In the second driving mode, each image becomes a low-resolution image with a portion of the image signals thinned out. This decrease in the amount of image signals to be transferred from the pixel area to the memory area through one pixel output line allows a corresponding increase in the imaging speed. Thus, as compared to the first driving mode, the second driving mode offers a higher imaging speed in exchange for the deterioration in the image quality.

In one preferable variation of the method for driving a solid-state image sensor according to the third aspect of the present invention, the N picture elements to be connected to the same pixel output line are an even number of picture elements neighboring each other in a vertical direction, and the driving operation in the second driving mode is performed in such a manner that only a total of N/2 picture elements located at alternating positions in the vertical direction are used among each group of the N picture elements and the thereby used picture elements are located at alternating positions in each row of laterally neighboring picture elements within the pixel area so that the picture elements arranged in a pattern corresponding to one color (e.g. white) of a checkerboard pattern are selected over the entire pixel area. By this method, the picture elements to be thinned out will be dispersed and not gathered, so that the imaging speed can be increased with the least possible deterioration in the image quality.

In one preferable variation of the method for driving method according to the third aspect of the present invention, not only the memory units originally coupled with the selected portion of the picture elements, but also the memory units corresponding to the non-selected picture elements, are assigned to the selected picture elements in the second driving mode so as to provide a larger memory capacity for the selected portion of the picture elements. This method makes it possible to increase the number of image frames that can be consecutively taken, i.e. to provide a longer period of time for the imaging, when the image quality is lowered and the imaging speed is increased.

Effect of the Invention

In the solid-state image sensor according to the first or second aspect of the present invention, noise factors, such as an error in the offset voltage or gain characteristics among the picture elements, are eliminated, and the variation in the ground potential is also reduced. As a result, the quality of the image signal, or the S/N ratio, in each picture element is enhanced, and the image quality is improved.

By the method for driving a solid-state image sensor according to the third aspect of the present invention, the area occupied by the pixel output lines on the sensor is reduced, and yet the imaging speed can be increased.

BRIEF DESCRIPTION OF THE DRAWINGS

FIG. 5 is a schematic time chart of an operation in one picture element of the solid-state image sensor of the first embodiment.

FIGS. 6A and 6B are graphs showing the input-output voltage characteristics of the source follower amplifiers of 12 picture elements, computed by a circuit simulation for a conventional system and the system of the first embodiment.

FIGS. 11A and 11B are schematic time charts of each driving mode in the solid-state image sensor of the second embodiment.

FIGS. 12A and 12B are schematic time charts of each driving mode in the solid-state image sensor of the second embodiment.

BEST MODE FOR CARRYING OUT THE INVENTION

First Embodiment

A solid-state image sensor and a method for driving the same as the first embodiment of the present invention is hereinafter described with reference to the attached drawings.

Figure 1:
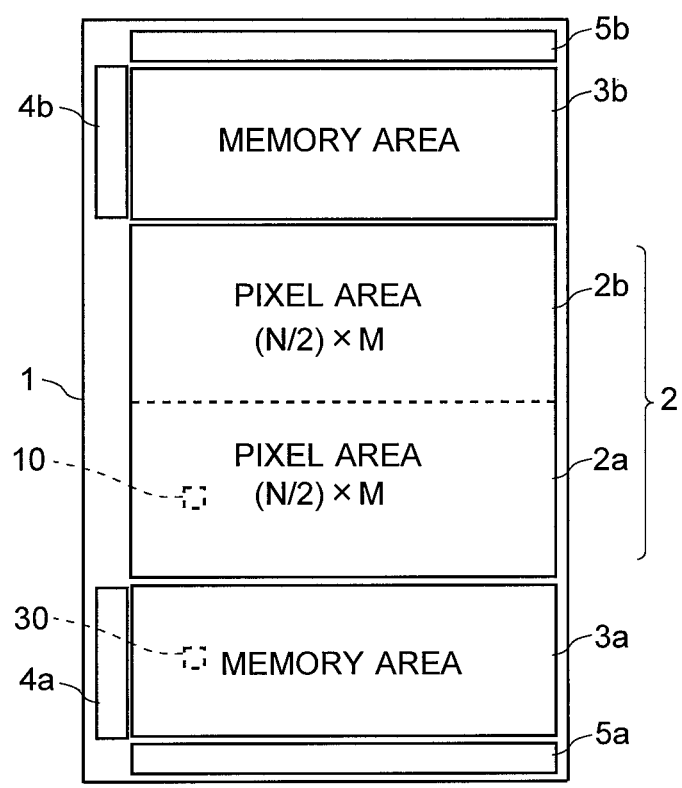
FIG. 1 is a schematic plan view showing the layout on a semiconductor chip of a solid-state image sensor as the first embodiment of the present invention.
Figure 2:
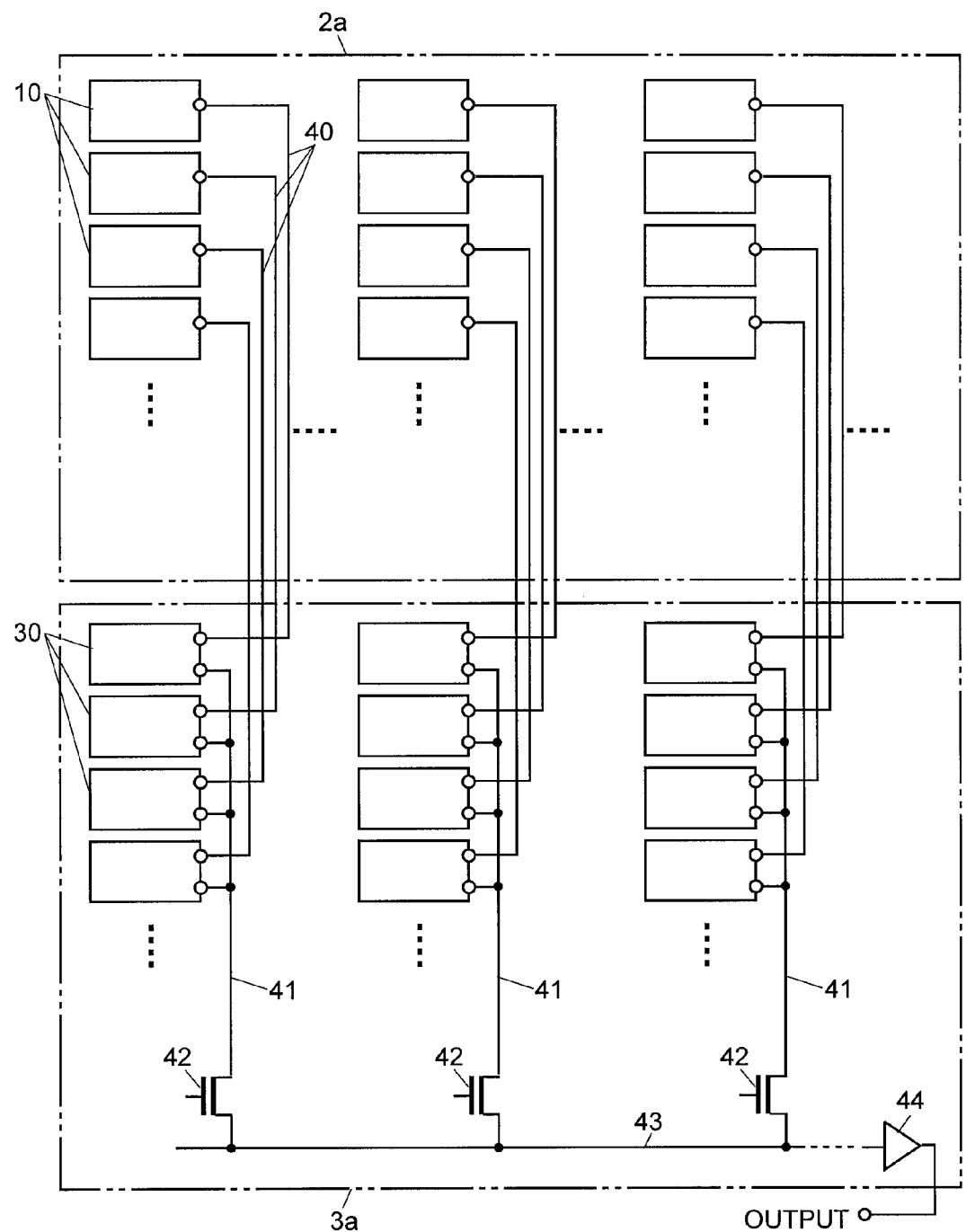
FIG. 2 is a diagram showing how picture elements and memory units are connected in the solid-state image sensor of the first embodiment.
Figure 3:
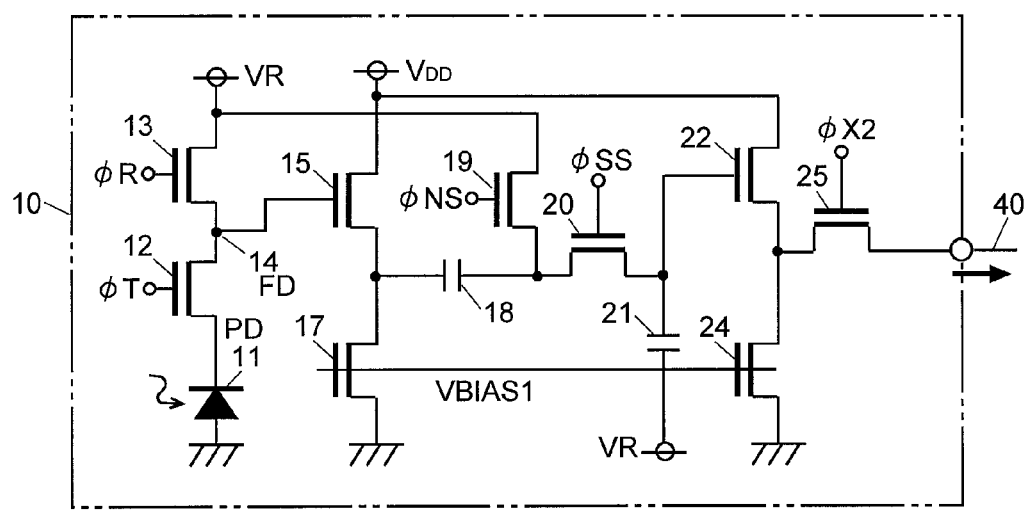
FIG. 3 is a circuit configuration diagram of one picture element in a memory area of the solid-state image sensor of the first embodiment.
Figure 4:
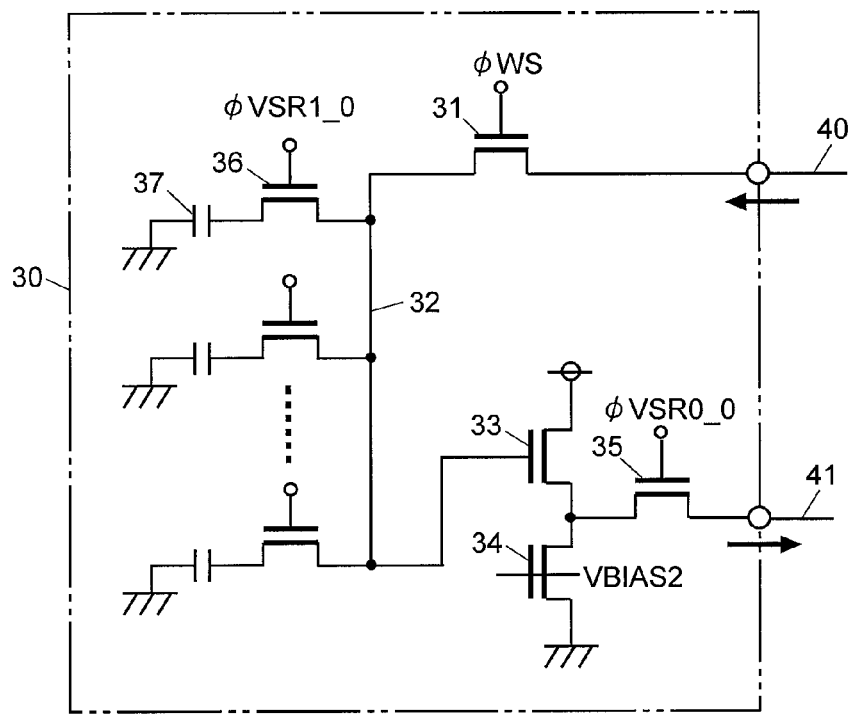
FIG. 4 is a circuit configuration diagram of one memory unit of the solid-state image sensor of the first embodiment.

The circuit configuration and structure of the entire solid-state image sensor according to the present embodiment is described by means of FIGS. 1-4. FIG. 1 is a schematic plan view showing the layout on the semiconductor chip of the solid-state image sensor of the first embodiment, FIG. 2 is a diagram showing how picture elements and memory units are connected, FIG. 3 is a circuit configuration diagram of one picture element in the memory area, and FIG. 4 is a circuit configuration diagram of one memory unit.

As shown in FIG. 1, the present solid-state image sensor includes a semiconductor substrate 1, on which one large pixel area 2 for receiving incident light and generating a pixel signal at each picture element, and two memory areas (the first memory area 3a and the second memory area 3b) for holding pixel signals until they are read to the outside, are provided. The pixel area 2 and the memory areas 3a and 3b are separated from each other, with each area shaped as one block. The roughly rectangular pixel area 2 has a total of N×M picture elements 10 arranged in a two-dimensional array of N rows and M columns. The pixel area 2 is divided into two halves, i.e. the first pixel area 2a and the second pixel area 2b, with each area having (N/2)×M picture elements 10. Each of the first and second memory areas 3a and 3b has (N/2)×M memory units 30 arranged in a two-dimensional array.

A first vertical scan circuit area 4a and a first lateral scan circuit area 5a are provided near the first memory area 3a. Similarly, a second vertical scan circuit area 4b and a second lateral scan circuit area 5b are provided near the second memory area 3b. Both the first vertical scan circuit area 4a and the first lateral scan circuit area 5a include shift registers, decoders and other circuits for controlling the reading of signals from the memory cells included in the memory units 30 of the first memory area 3a. A similar circuit is also provided in the second vertical scan circuit area 4b and the second lateral scan circuit area 5b.

As shown in FIG. 1, the solid-state image sensor of the present embodiment has a roughly symmetrical structure with respect to the central line dividing the pixel area 2 into the first and second pixel areas 2a and 2b (the straight, dotted line in FIG. 1). Since the two sections separated by this line are identical in terms of structure and operation, the following description mainly deals with the structure and operation of the first pixel area 2a, the first memory area 3a, the first vertical scan circuit area 4a and the first lateral scan circuit area 5a.

The number of picture elements arranged in the pixel area 2, i.e. the values of N and M, can be independently and arbitrarily set. Increasing these values improves the resolution of the images. However, it also disadvantageously increases the area of the entire chip, or if the chip area is fixed, it decreases the chip area per pixel and lowers the sensitivity. In the present example, N=256 and M=400. Accordingly, the number of pixels arranged in each of the first and second pixel areas 2a and 2b is 400 pixels in the lateral direction and 128 pixels in the vertical direction.

As shown in FIG. 2, one picture element 10 in the pixel area 2a is connected with one memory unit 30 in the memory area 3a via one pixel output line 40. Accordingly, the pixel area 2a and the memory area 3a are connected by the same number of pixel output lines 40 as that of the picture elements 10 in the area 2a or the memory units 30 in the area 3a (128×400 in the present example). The outputs of all the memory units vertically arranged in the memory area 3a are connected to a common vertical output line 41 and further connected to a common output line 43 via a vertical transfer gate 42, to be eventually connected to an external system via an output buffer 44.

As shown in FIG. 3, one picture element 10 includes a photodiode (PD) 11, a transfer transistor 12, a reset transistor 13, a floating diffusion (FD) 14, a first-stage buffer transistor 15, a first-stage bias transistor 17, a first capacitor 18, a first sampling transistor 19, a second sampling transistor 20, a second capacitor 21, a source follower amplifying transistor 22, a load-current source transistor 24, and an output control transistor 25.

The photodiode 11 receives light and generates photocharges. The floating diffusion 14, which corresponds to the detection node in the present invention, temporarily accumulates photocharges and converts them into voltage signals. The transfer transistor 12, which corresponds to the transfer gate in the present invention, is used for transferring photocharges from the photodiode 11 to the floating diffusion 14. The reset transistor 13, which corresponds to the reset element, is used for discharging electric charges accumulated in the floating diffusion 14. The first capacitor 18, the second capacitor 21, the first sampling transistor 19 and the second sampling transistor 20 constitute a correlated double sampling (CDS) circuit. The first-stage buffer transistor 15 and the first-stage bias transistor 17 constitute a buffer which functions as an interface between the floating diffusion 14 and the CDS circuit. The source follower amplifying transistor 22, the load-current source transistor 24 and the output control transistor 25 constitute a system for outputting accumulated charge signals from the floating diffusion 14 through the CDS circuit to the pixel output line 40 as voltage signals. This system corresponds to the buffer circuit in the present invention.

Drive lines for supplying drive pulse signals (control signals) φT, φR, φNS, φSS and φX2 are connected to the gate terminals of the transfer transistor 12, the reset transistor 13, the first sampling transistor 19, the second sampling transistor 20 and the output control transistor 25, respectively. These drive lines are common to all the picture elements 10 in the pixel area 2. Through these lines, all the picture elements 10 included in the pixel areas 2a and 2b can be simultaneously driven for performing various operations, such as the accumulation of electric charges.

FIG. 5 is a schematic time chart showing the operation from photoelectric conversion to signal transmission in one picture element 10. With reference to this chart, the operation in the picture element 10 is hereinafter described.

Before the signal charges are transferred from the photodiode 11 to the floating diffusion 14, the reset transistor 13 is turned on to reset the floating diffusion 14 to the source voltage VR. However, when the reset transistor 13 is subsequently turned off to bring the floating diffusion 14 into the floating state, a thermal noise is introduced into the capacitor of the floating diffusion 14, which causes a fluctuation in the voltage of the floating diffusion 14 and prevents the voltage from being exactly the same as the source voltage (reset voltage) VR. If the transfer of the signal charges from the photodiode 11 to the floating diffusion 14 is initiated while the aforementioned fluctuating component (which is called the reset noise) is present, the voltage signal to be eventually outputted will contain that noise superimposed on the signal charges. To avoid this, the noise is removed in the following manner in the process of outputting image signals.

At time t1 in FIG. 5 (where φT is switched from ON to OFF), the transfer transistor 12 is turned off, whereupon the photodiode 11 is brought into the floating state and the electric charges generated by photoelectric conversion begins to be accumulated (exposure). By this point, the floating diffusion 14 is reset to the reset voltage VR. At a slightly later time t2 (where φR is switched from ON to OFF), the reset transistor is turned off, whereby the floating diffusion 14 is brought into the floating state. As already noted, the voltage at the floating diffusion 14 at this point in time is the reset voltage VR plus the reset noise voltage. At time t3 (where φNS and φSS are switched from OFF to ON), both the first and second sampling transistors 19 and 20 are turned on, whereby both the terminal voltage of the first capacitor 18 on the side connected to the second sampling transistor 20 and that of the second capacitor 21 on the side connected to the second sampling transistor 20 are reset to the reset voltage VR.

At time t4 (where φNS is switched from ON to OFF), only the first sampling transistor 19 is turned off, whereupon both the terminal of the first capacitor 18 on the side connected to the second sampling transistor 20 and that of the second capacitor 21 on the side connected to the second sampling transistor 20 are brought into the floating state. At this point, if the voltage given to the first capacitor 18 through the first-stage buffer transistor 15 is the reset voltage plus the reset noise voltage, the voltage applied to the gate terminal of the source follower amplifying transistor 22 is the reset voltage VR. Thus, the reset noise is removed. At time t5 (where φT is switched from OFF to ON), the transfer transistor 12 is turned to transfer signal charges from the photodiode 11 to the floating diffusion 14. As a result, the voltage applied to the gate terminal of the source follower amplifier 22 decreases from the reset voltage VR by the net signal voltage multiplied by the gain of the CDS circuit.

At time t6 (where φSS is switched from ON to OFF), the second sampling transistor 20 is also turned off, whereby the voltage applied to the gate terminal of the source follower amplifier 22 is fixed. This voltage is equal to the net signal voltage multiplied by the gain of the CDS circuit, free of the reset noise voltage. Subsequently, at time t7 (where φX2 is switched from OFF to ON), the output control transistor 25 is turned on, whereupon the signal voltage free of the reset noise at the floating diffusion 14 is sent through the source follower amplifier 22 to the pixel output line 40.

In the previous description, the reset noise at the CDS circuit is not considered. In practice, a reset noise similar to the one occurring at the floating diffusion 14 can also occur when the first and second capacitors 18 and 21 are brought into the floating state. However, this reset noise is practically negligible, since its influence can be decreased by making the capacities of the first and second capacitors 18 and 21 higher than that of the floating diffusion 14.

As shown in FIG. 4, one memory unit 30 includes a write transistor 31 connected to the pixel output line 40 extending from the pixel area 2a, a read buffer transistor 33, a bias transistor 34, a read transistor 35, as well as sampling transistors 36 and capacitors 37 which are connected to an internal signal line 32 of the memory unit between the write transistor 31 and the read buffer transistor 33 and whose number is equal to the number L of frames to be accumulated (L=128 in the present example). For example, the capacitors 37 can be created by a double polysilicon gate structure or a stack structure. A drive line for supplying a drive pulse signal φWS common to all the memory units 30 is connected to the gate terminal of the write transistor 31. A drive line for supplying another drive pulse signal φVSR, which is common to the picture elements in one row but different for each of the vertically arranged rows, is connected to the gate terminal of the read transistor 35. Furthermore, drive lines for supplying drive pulse signals φVSR1, which are different among the L pieces of sampling transistors included in one memory unit 30 but common to the sampling transistors with the same number in all the memory units 30, are connected to the gate terminals of the sampling transistors 36.

In this memory unit 30, while an output signal from the corresponding picture element 10 is present on the pixel output line 40, when the read transistor 35 is turned off, the write transistor 31 is turned on, and any one of the 128 sampling transistors 36 is selectively turned on, the signal present on the internal signal line 32 of the memory unit is written in the capacitor 37 connected to the activated sampling transistor. In this writing operation, the pixel signals corresponding to up to 128 frames of consecutive images can be individually stored in the capacitors 37 by sequentially and individually activating the sampling transistors 36 by the drive pulse signal φVSR1.

Conversely, while the write transistor 31 is in the OFF state, when the read transistor 35 is turned on and any one of the 128 sampling transistors 36 are selectively turned on, the pixel signal held in the capacitor 37 connected to the selected sampling transistor 36 is read to the internal signal line 32 of the memory unit, to be eventually outputted through the read buffer transistor 33 and the read transistor 35 to the outside. During this reading operation, the pixel signals corresponding to up to 128 frames of consecutive images individually held in the capacitors 37 can be sequentially, or serially, read out by individually and sequentially activating the sampling transistors 36 by the drive pulse signal φVSR1.

One feature of the solid-state image sensor of the present embodiment is that the load-current source transistor 24 acting as the load-current source for the source follower amplifying transistor 22 is provided inside each picture element 10. Accordingly, even when both the output control transistor 25 in the picture element 10 and the write transistor 31 in the memory unit 30 are in the ON state, the bias current for the source follower amplifying transistor 22 does not pass through the pixel output line 40 connecting the picture element 10 and the memory unit 30. Immediately after the output control transistor 25 is turned on, an electric current for charging or discharging the capacity of the pixel output line 40 and that of the capacitor 37 selected for the writing operation passes through the pixel output line 40. However, no electric current will flow after the charging or discharging is completed. Therefore, no voltage drop occurs even if the resistance of the pixel output line 40 is to some extent high. The absence of the high-resistance pixel output line 40 in the source follower amplification circuit also prevents the deterioration in the gain characteristics due to that line. The dispersed arrangement of the load-current source transistors 24 suppresses an increase or fluctuation in the ground potential, allowing only a negligible deterioration in the gain characteristics due to that increase or fluctuation.

Therefore, in the solid-state image sensor of the present embodiment, the variation in the offset voltage or the gain characteristics in each picture element 10 is smaller than in the conventional solid-stage image sensors of this type. Therefore, the S/N ratio of the pixel signals is higher and the image quality is also accordingly higher.

A calculation for verifying the performance of the solid-state image sensor of the present embodiment as compared to a conventional solid-state image sensor was conducted using the simulation software "SPICE", the result of which is hereinafter described. The simulation calculation was performed for each of the 12 picture elements which were almost evenly dispersed over one half of the first pixel area 2a.

FIGS. 6A and 6B are graphs showing the input-output voltage characteristics of the source follower amplifiers of 12 picture elements of a conventional system (FIG. 6A) and the system of the present embodiment (FIG. 6B). The conventional system shows a large variation in the output voltage, which is due to the voltage drop resulting from the resistance of the pixel output line as well as the fluctuation in the bias current associated with the increase in the potentials on the return paths of the currents in the current-source area. By contrast, in the system of the present embodiment, since the voltage drop due to the resistance of the pixel output line is extremely small, the variation mostly results from the fluctuation in the bias current associated with an increase in the potentials on the return paths of the currents in the pixel area, and this potential increase is small since the currents are not gathered in such a small area as current-source area. Therefore, the variation in the output voltage is also small.

Figure 7A:
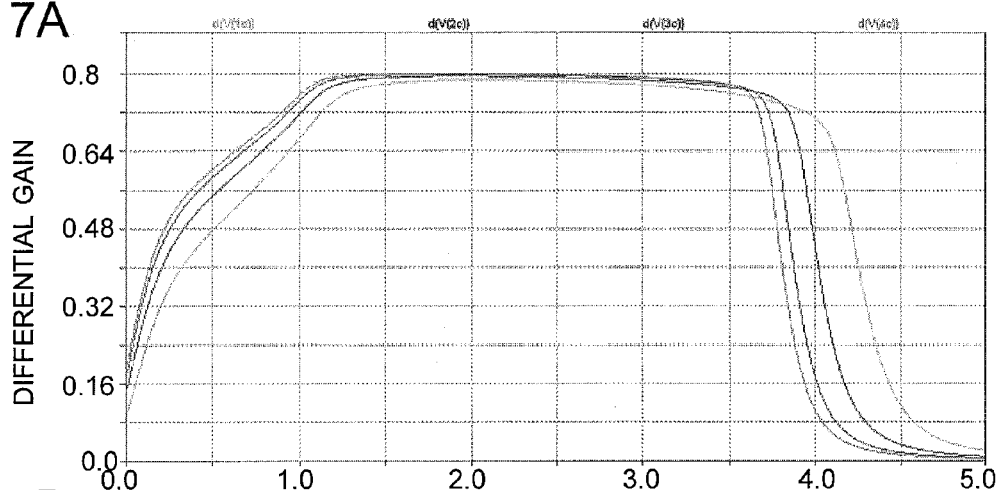
FIGS. 7A and 7B are graphs showing the gain characteristics of the source follower amplifiers of four picture elements at the most remote position within the pixel area from the bottom end of the pixel area, computed by a circuit simulation for a conventional system and the system of the first embodiment.
Figure 7B:
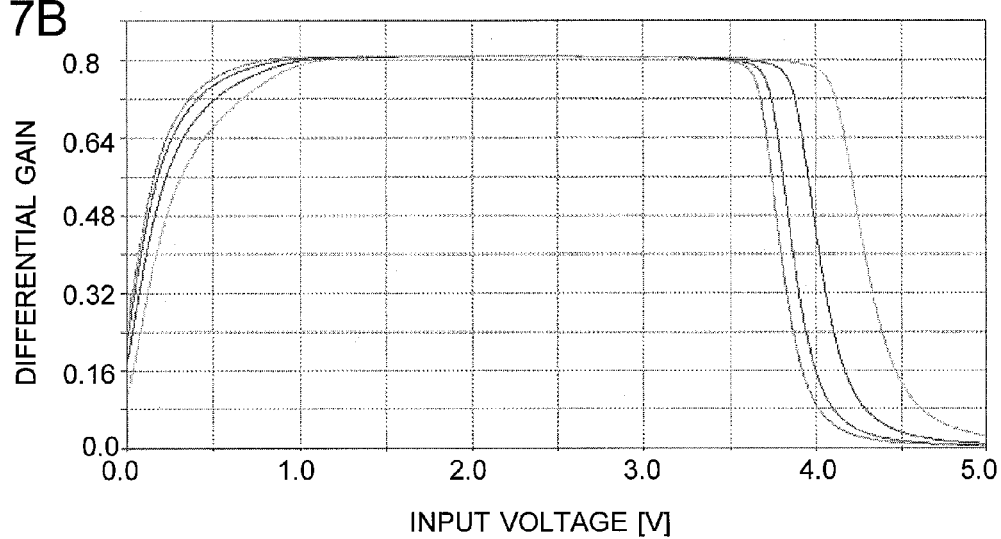

FIGS. 7A and 7B are graphs showing the differential gain characteristics of the source follower amplifiers of four picture elements at the most remote position within the pixel area 2a from the bottom end. As shown in FIG. 7A, the gain of the conventional system is less than 0.8. Furthermore, the gain curves barely have flat sections and the gain errors among the picture elements are considerably large. By contrast, as shown in FIG. 7B, the gain of the system of the present embodiment is almost flat within a range from 1.0 to 3.5 V in input voltage, with the gain values exceeding 0.8. These results confirm that the system of the present embodiment has almost no gain errors among the picture elements and can achieve a high level of gain.

Second Embodiment

The configuration and operation of a solid-state image sensor according to the second embodiment of the present invention is hereinafter described.

In the solid-state image sensor of the first embodiment, a separate pixel output line is provided for each picture element to connect one picture element and one memory unit. This design allows the simultaneous transfer of signals at all the picture elements. However, the pixel output lines occupy a considerable area on the semiconductor substrate 1, making it difficult to ensure a large area for the photodiode 11. To address this problem, in the solid-state image sensor of the second embodiment, the area occupied by the pixel output lines is decreased at a slight sacrifice of the imaging speed so as to increase the area, or the aperture ratio, of the photodiode.

Figure 8:
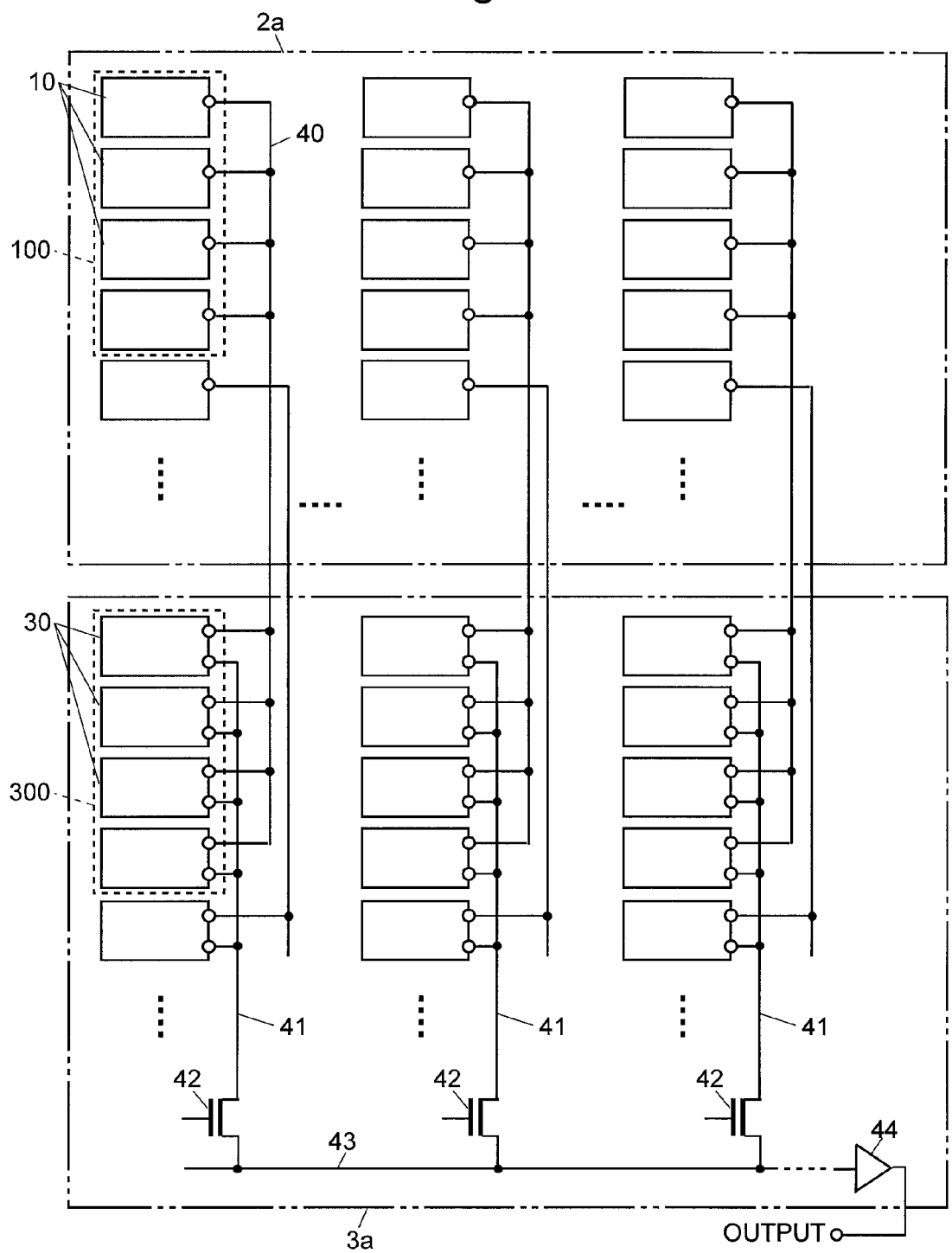
FIG. 8 is a diagram showing how picture elements and memory units are connected in the solid-state image sensor of the second embodiment of the present invention.
Figure 9:
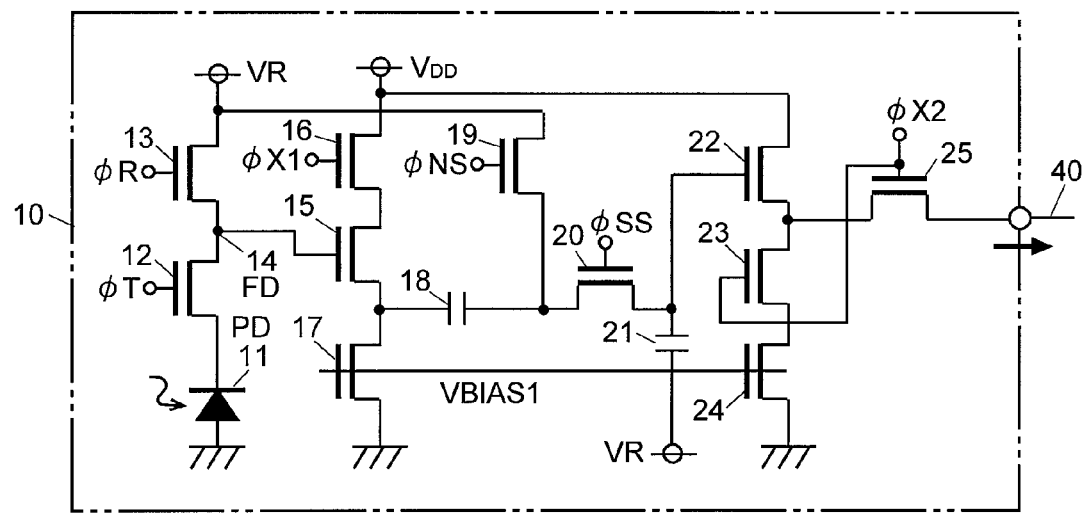
FIG. 9 is a circuit configuration diagram of one picture element in a memory area of the solid-state image sensor of the second embodiment.
Figure 10:
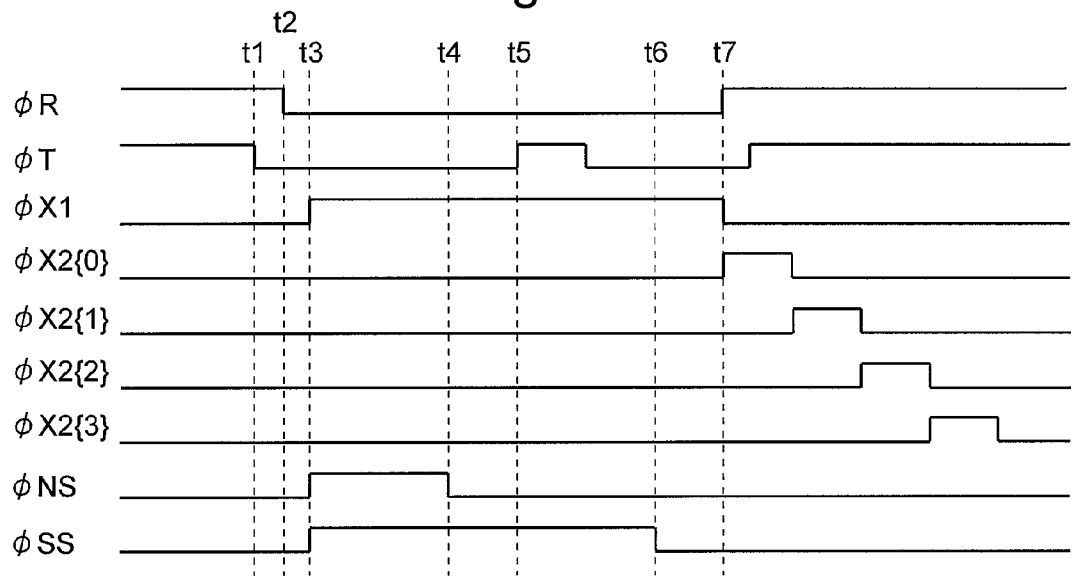
FIG. 10 is a schematic time chart of an operation in one picture element of the solid-state image sensor of the second embodiment.

FIG. 8 is a schematic diagram showing how picture elements and memory units are connected in the solid-state image sensor of the present embodiment, FIG. 9 is a circuit configuration diagram of one picture element in the memory area of the solid-state image sensor of the present embodiment, and FIG. 10 is a schematic time chart of an operation from photoelectric conversion to signal transmission in one picture element 10. The circuit configuration of one memory unit 30 in the memory area is the same as shown in FIG. 4 of the first embodiment and hence will not be specifically described.

As shown in FIG. 8, in the solid-state image sensor of the second embodiment, four picture elements 10 (surrounded by the dotted line 100 in FIG. 8) neighboring each other in the vertical direction in the pixel area 2a, i.e. in the extending direction of the pixel output line 40, and four memory units 30 (surrounded by the dotted line 300 in FIG. 8) neighboring each other in the vertical direction, are connected by one pixel output line 40. That is to say, every four picture elements 10 arranged in the vertical direction and every four memory units 30 arranged in that direction are respectively grouped as one set, and each group of picture elements is connected to one group of memory units by one pixel output line 40. By this design, the number of pixel output lines 40 provided between the pixel area 2a and the memory area 3a per vertical column is reduced from 128 (the number of lines used in the first embodiment) to one fourth, or 32. The result is an increase in the aperture ratio, which is effective for improving the sensitivity or S/N ratio. However, in this case, it is necessary to control the timing of outputting signals from the four picture elements 10 sharing one pixel output line 40 so that the signals will be selectively outputted, i.e. so that they will not be simultaneously outputted from two or more picture elements 10.

A comparison of the pixel structure of the present embodiment shown in FIG. 9 with the pixel structure shown in FIG. 3 demonstrates the difference that the picture element 10 in FIG. 9 has a first current-breaking transistor 16 serially connected to the first-stage buffer transistor 15 and a second current-breaking transistor 23 serially connected to the source follower amplifying transistor 22. A drive line for supplying a drive pulse signal $\phi X1$ is connected to the gate terminal of the first current-breaking transistor 16. On the other hand, a drive line for supplying a drive pulse signal $\phi X2$, which is the same as the signal supplied to the gate terminal of the output control transistor 25, is connected to the gate terminal of the second current-breaking transistor 23.

The operations for the photoelectric conversion and the reset-noise removal in one picture element in the solid-state image sensor of the second embodiment are the same as in the first embodiment. Accordingly, only the particularly different points will be hereinafter described with reference to FIG. 10. The first current-breaking transistor 16 is turned on at time t3, i.e. almost simultaneously with the activation of the sampling transistors 19 and 20, and is turned off at time t7, i.e. immediately before the output of the signal through the output control transistor 25 is initiated. That is to say, the first current-breaking transistor 16 turns on and thereby activates the first-stage buffer transistor 15 only during the period of time when the voltage of the floating diffusion 14 needs to be supplied to the first capacitor 18 and the subsequent, second capacitor 21. In other words, while the first buffer transistor 15 does not need to be active, the first current-breaking transistor 16 is turned off to discontinue the supply of the bias current to the first-stage buffer transistor 15 and thereby suppress the power consumption.

The second current-breaking transistor 23 is simultaneously turned on and off with the output control transistor 25. In other words, while the no voltage signal is present on the pixel output line 40, the second current-breaking transistor 23 is maintained in the OFF state so as not to supply the bias current to the source follower amplifying transistor 22. Thus, the power consumption is suppressed.

In order to sequentially send signals from the four picture elements 10 sharing one pixel output line 40 to this pixel output line 40 by a time-sharing control in the previously described manner, four drive pulse signals $\phi X2\{0\}$, $\phi X2\{1\}$, $\phi X2\{2\}$ and $\phi X2\{3\}$ are supplied to the gate terminals of the output control transistors 25 of the four picture elements 10, respectively. That is to say, the drive pulse signal $\phi X2\{0\}$ is supplied to the gate terminal of the output control transistor 25 of the first picture element 10 among the four picture elements 10 sharing one pixel output line 40. While this signal $\phi X2\{0\}$ is at the high level, the output control transistor 25 is in the ON state, allowing the pixel signal to be sent from the picture element 10 concerned to the pixel output line 40. Meanwhile, the write transistor 31 of the corresponding memory unit 30 is activated in synchronization with the signal transmission from one picture element 10, whereupon the signal is stored in the capacitor 37 connected to the activated sampling transistor 36.

The solid-state image sensor of the second embodiment can be driven in two modes, i.e. the full-pixel burst mode (which corresponds to the first drive mode in the present invention) which uses all the picture elements to acquire images with high resolutions as in the first embodiment, and the half-pixel burst mode (which corresponds to the second drive mode in the present invention) which uses only one half of the picture elements to acquire images with lower resolutions yet at higher speeds than the full-pixel burst mode.

FIGS. 11A and 12A are timing charts of drive pulse signals for the main components in the full-pixel burst mode. FIG. 12A is the continuation to the FIG. 11A. The drive pulse signal $\phi X1$ is omitted from these figures.

The operation in this mode is a global-shutter operation: each of the drive pulse signals ($\phi R$, $\phi T$, $\phi NS$ and $\phi SS$) supplied to the picture elements 10 simultaneously changes at all the picture elements with the same timing. Meanwhile, the drive pulse signal $\phi X2$ for turning on and off the output control transistor 25 has four lines $\phi X2\{0\}$-$\phi X2\{3\}$ respectively corresponding to the four picture elements 10 sharing the same pixel output line 40, whereby the pixel signals produced by the four picture elements 10 are individually and sequentially connected to one pixel output line 40 with different timings. This operation has already been described.

One pixel output line 40 is connected to each of the four memory units 30 via the write transistor 31, which can be turned on and off by the drive pulse signal $\phi WS$. The drive pulse signal for selecting one of the 128 memory cells (each cell consisting of a sampling transistor 36 and a capacitor 37) included in one memory unit 30 has four lines $\phi VSR1\{0\}$-$\phi VSR1\{3\}$. As shown in FIGS. 11A-12B, each of these signals connects one of the four memory units to the pixel output line 40 with a different timing.

By the previously described driving method, it is possible to write a pixel signal in one of the memory cells in the memory unit 30 coupled with the picture element 10 on a one-to-one basis, without causing a mixture of pixel signals from the four lines sharing the pixel output line 40. However, since one pixel output line 40 is time-shared for the sampling of signals from the four picture elements, the full-pixel burst mode requires a sampling time of approximately four times as long as the time required in the system of the first embodiment. If the frame rate is low, there will be no particular problem, since the duration of one sampling pulse is short, e.g. within a range from a few nanoseconds to several tens of nanoseconds. However, it certainly constitutes a limiting factor for the maximum frame rate (which is assumed to be a few to ten Mfp or higher). To address this problem, in the half-pixel burst mode, pixel signals are read from only one or two of the four picture elements sharing one pixel output line 40, and the other picture elements are bypassed, so as to allow an increase in the maximum frame rate.

As shown in FIGS. 11B and 12B, the drive pulse signals φX2{1} and φX2{3} are always at the low level, which means that two of the four picture elements are practically unused (i.e. bypassed). On the other hand, in the memory units 30, each of the drive pulse signals φVSR1{0}-φVSR1{3} has a timing at which the signal is switched to the high level, which means that the memory units 30 corresponding to the bypassed picture elements are also activated to write signals in the memory cells of these memory units 30. As a result, the number of image frames that can be consecutively acquired without reading the signal to the outside is increased to 256 frames, which is two times as large as the normal number, and accordingly, the available imaging time is also doubled.

Figure 13:
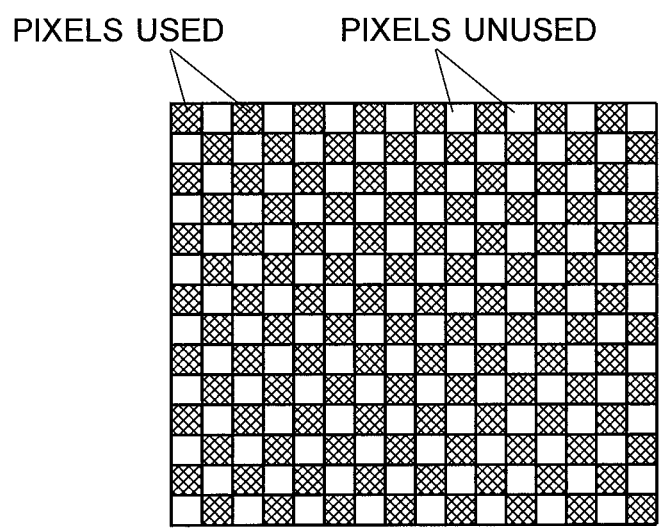
FIG. 13 is a conceptual diagram showing the position of the picture elements to be driven in the half-pixel drive mode in solid-state image sensor of the second embodiment.

If the wires of the drive pulse signals φX2{0} and φX2{1}, or φX2{2} and φX2{3}, are arranged in a staggered pattern in step with the alternation of the even-numbered and odd-numbered columns, the picture elements thinned out in the half-pixel burst mode will form a checkerboard pattern, as shown in FIG. 13. This pattern prevents a substantial deterioration in both vertical and lateral resolutions.

Figure 14:
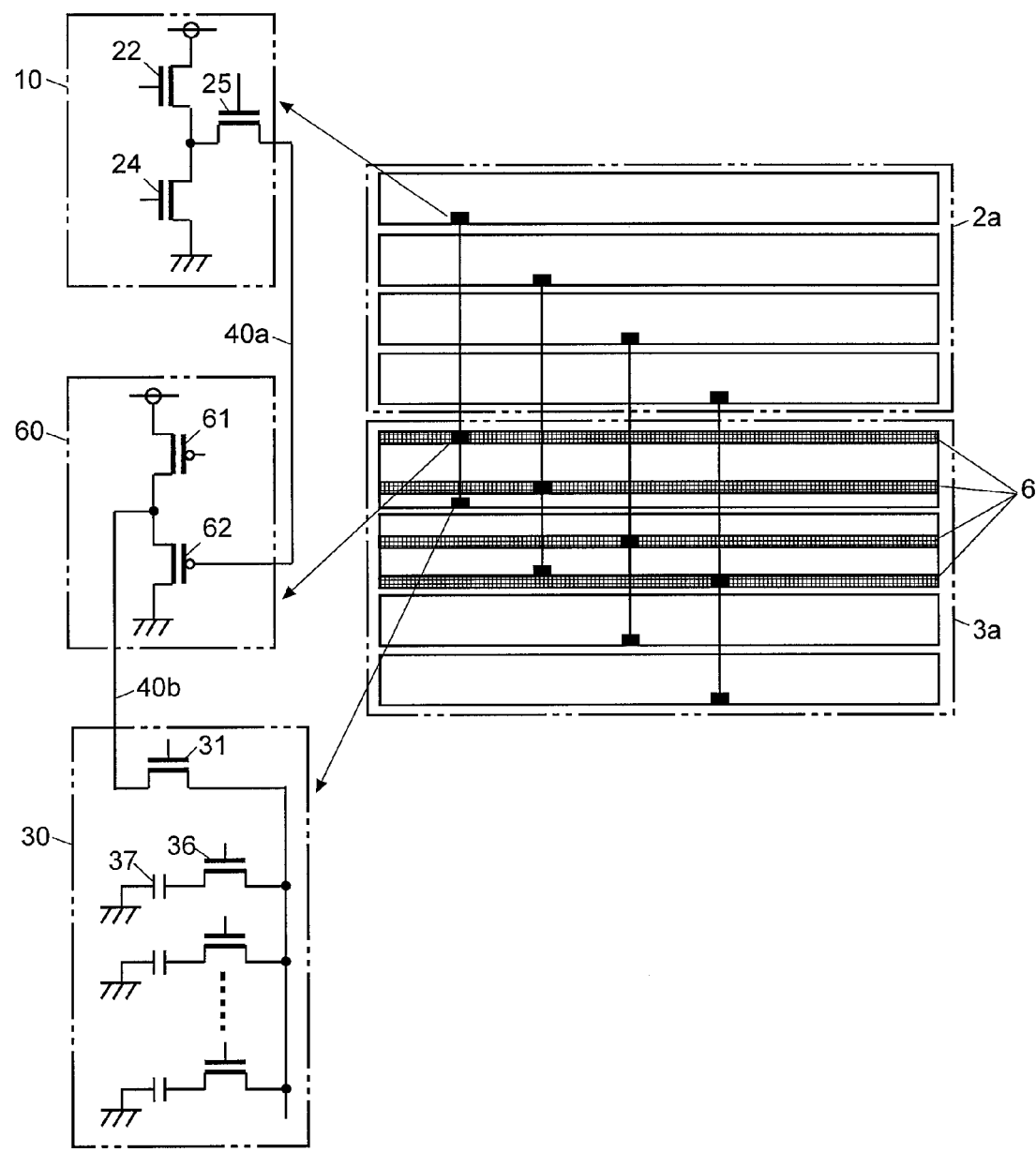
FIG. 14 is a diagram showing how picture elements, relay amplifiers and memory units are connected in a solid-state image sensor of the third embodiment of the present invention.

In any of the previously described embodiments, the picture element 10 in the pixel area 2a and the memory unit 30 in the memory area 3a are directly connected by the pixel output line 40. However, for example, if a sensor chip having a larger area is used to increase the number of pixels, the pixel output line 40 will be so long that the source follower amplifying transistor 22 inside the picture element 10 may not be powerful enough to drive it. In such a case, as shown in FIG. 14 for example, a source follower amplifier 60 for relaying signals may be provided in the middle of the pixel output line 40 (40a and 40b). In the example of FIG. 14, one signal-relaying source follower amplifier 60 is composed of two transistors 61 and 62, although this is not the only possible configuration. Another point is that the signal-relaying source follower amplifiers 60 provided in the pixel output lines 40 are not gathered in one small area but are arranged in a dispersed fashion so that each of the strip-shaped, lateral areas 6 provided for arranging the relaying source follower amplifiers on the memory area 3a includes roughly the same number of signal-relaying source follower amplifiers 60. This is aimed at dispersing electric power as well as equalizing the loads to be shared with the source follower amplifiers inside the picture elements 10.

Sharing the load of driving one pixel output line 40 with the relaying source follower amplifier in the memory area 3 (3a and 3b) instead of driving the line with only the source follower amplifier in the picture element 10 reduces the load per amplifier and enables a faster driving. Another possible choice is to reduce the bias current without increasing the speed, in which case the gain characteristics further improves and the amount of electric current consumed in the pixel area decreases. A decrease in the amount of electric current consumed in the pixel area leads to a corresponding increase in the amount of electric current consumed in the portions of the memory area where the source follower amplifiers are provided. This means that the total electric power is dispersed over the entire area of the sensor chip, which is preferable in that the power concentration, which can cause an increase in the ground potential or other problems, is moderated.

It should be noted that the previously described embodiments are mere examples of the solid-state image sensor and its driving method according to the present invention, and any change, modification or addition appropriately made within the spirit of the present invention will evidently fall within the scope of claims of the present patent application.

Specifically, the numerical values used in the previous descriptions are mere examples and do not limit the configuration or structure of the solid-state image sensor according to the present invention. As for the circuit configuration inside one picture element, any component which is optional for the present invention, such as the aforementioned CDS circuit, can be naturally omitted, as long as the photodiode, the detection node, the transfer gate, the buffer circuit and other essential components for the present invention are provided.

EXPLANATION OF NUMERALS

1 . . . Semiconductor Substrate
2, 2a, 2b . . . Pixel Area
3, 3a, 3b . . . Memory Area
4a, 4b . . . Vertical Scan Circuit Area
5a, 5b . . . Lateral Scan Circuit Area
6 . . . Area for Relaying Source Follower Amplifier
10 . . . Picture Element
11 . . . Photodiode
12 . . . Transfer Transistor
13 . . . Reset Transistor
14 . . . Floating Diffusion (FD)
15 . . . First-Stage Buffer Transistor
16 . . . First Current-Breaking Transistor
17 . . . First-Stage Bias Transistor
18 . . . First Capacitor
19 . . . First Sampling Transistor
20 . . . Second Sampling Transistor
21 . . . Second Capacitor
22 . . . Source Follower Amplifying Transistor
23 . . . Second Current-Breaking Transistor
24 . . . Load-Current Source Transistor
25 . . . Output Control Transistor
30 . . . Memory Unit
31 . . . Write Transistor
32 . . . Internal Signal Line of Memory Unit
33 . . . Read Buffer Transistor
34 . . . Bias Transistor
36 . . . Sampling Transistor
37 . . . Capacitor
40 . . . Pixel Output Line
41 . . . Vertical Output Line
42 . . . Vertical Transfer Gate
43 . . . Output Line
44 . . . Output Buffer
60 . . . Signal-Relaying Source Follower Amplifier

The invention claimed is:
1. A solid-state image sensor comprising:
a pixel area with a plurality of picture elements arranged therein, each picture element including a photodiode, a detection node for converting a photocharge generated by the photodiode from an electric-charge signal into a voltage signal, a transfer gate for controlling a transfer of a photocharge from the photodiode to the detection node, and a buffer circuit for transmitting the voltage signal produced by the detection node to one of the pixel output lines to be described later;

a memory area, which is separated from the pixel area, and in which a plurality of memory units whose number is equal to a number of picture elements are arranged, with each memory unit corresponding to one picture element and having a plurality of memory cells provided therein; and pixel output lines whose number is equal to the number of picture elements as well as a number of memory units, with each pixel output line separately connecting one picture element in the pixel area and one memory unit in the memory area, wherein the buffer circuit includes at least one current driver for driving the pixel output line, and the current driver includes a current source which is located inside the picture element concerned and which becomes a load.

2. A solid-state image sensor comprising:

a pixel area with a plurality of picture elements arranged therein, each picture element including a photodiode, a detection node for converting a photocharge generated by the photodiode from an electric-charge signal into a voltage signal, a transfer gate for controlling a transfer of a photocharge from the photodiode to the detection node, and a buffer circuit for transmitting the voltage signal produced by the detection node to a pixel output line to be described later;

a memory area, which is separated from the pixel area, and in which memory units are arranged, with each memory unit corresponding to one picture element and having a plurality of memory cells provided therein; and pixel output lines whose number is equal to a number of picture elements divided by N (where N is an integer equal to or greater than two), each pixel output line separately connecting one picture-element group consisting of N picture elements in the pixel area and one memory-unit group consisting of N memory units coupled with the aforementioned N picture elements, wherein the buffer circuit includes at least one current driver for driving the pixel output line and at least one pixel-selecting switch for selectively connecting one of the N picture elements to be connected to the same pixel output line, the current driver includes a current source which is located inside the picture element concerned and which becomes a load, and N pixel-selecting signal lines are separately and respectively connected to the pixel-selecting switches of the N picture elements to be connected to the same pixel output line.

3. The solid-state image sensor according to claim 2, wherein:

the buffer circuit includes a selector switch for turning on and off an operation of the current driver.

4. The solid-state image sensor according to claim 1, wherein:

a relay amplifier is provided in each of the pixel output lines, and a plurality of relay-amplifier areas formed along an extending direction of the pixel output lines are provided inside the memory area in order to arrange the relay amplifiers.

5. The solid-state image sensor according to claim 2, a relay amplifier is provided in each of the pixel output lines, and a plurality of relay-amplifier areas formed along an extending direction of the pixel output lines are provided inside the memory area in order to arrange the relay amplifiers.

6. A method for driving the solid-state image sensor, including: a pixel area with a plurality of picture elements arranged therein, each picture element including a photodiode, a detection node for converting a photocharge generated by the photodiode from an electric-charge signal into a voltage signal, a transfer gate for controlling a transfer of a photocharge from the photodiode to the detection node, and a buffer circuit for transmitting the voltage signal produced by the detection node to a pixel output line; a memory area, which is separated from the pixel area, and in which memory units are arranged, with each memory unit corresponding to one picture element and having a plurality of memory cells provided therein; and pixel output lines whose number is equal to a number of picture elements divided by N (where N is an integer equal to or greater than two), each pixel output line separately connecting one picture-element group consisting of N picture elements in the pixel area and one memory-unit group consisting of N memory units coupled with the aforementioned N picture elements, where the buffer circuit includes at least one current driver for driving the pixel output line and at least one pixel-selecting switch for selectively connecting one of the N picture elements to be connected to the same pixel output line, the current driver includes a current source which is located inside the picture element concerned and which becomes a load, and N pixel-selecting signal lines are separately and respectively connected to the pixel-selecting switches of the N picture elements to be connected to the same pixel output line, wherein following two driving modes can be selected:

a first driving mode, in which the N pixel-selecting switches are sequentially selected by a control signal through the N pixel-selecting signal lines so as to sequentially connect the N picture elements to the common pixel output line; and a second driving mode, in which only a portion of the N pixel-selecting switches are sequentially selected by using only a portion of the N pixel-selecting signal lines so as to connect a portion of the N picture elements to the common pixel output line.

7. The method for driving the solid-state image sensor according to claim 6, wherein:

the N picture elements to be connected to the same pixel output line are an even number of picture elements neighboring each other in a vertical direction, and the driving operation in the second driving mode is performed in such a manner that only a total of N/2 picture elements located at alternating positions in the vertical direction are used among each group of the N picture elements and the thereby used picture elements are located at alternating positions in each row of laterally neighboring picture elements within the pixel area so that the picture elements arranged in a pattern corresponding to one color of a checkerboard pattern are selected over the entire pixel area.

8. The method for driving the solid-state image sensor according to claim 6, wherein:

not only the memory units originally coupled with the selected portion of the picture elements, but also the memory units corresponding to the non-selected picture elements, are assigned to the selected picture elements in the second driving mode so as to provide a larger memory capacity for the selected portion of the picture elements.

* * * * *